Oct. 14, 1958 — R. H. KOEHLER — 2,856,513
WELDING GUNS
Filed Oct. 28, 1955
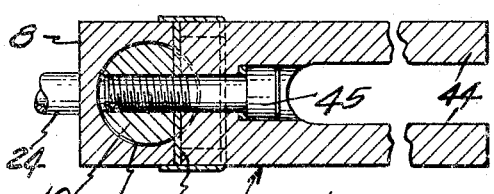
Fig. 2
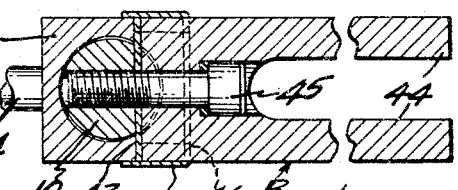
Fig. 5
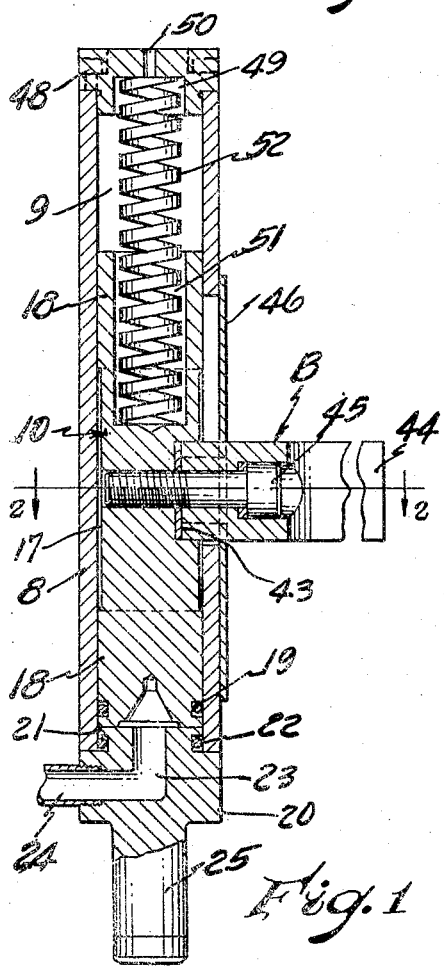
Fig. 1
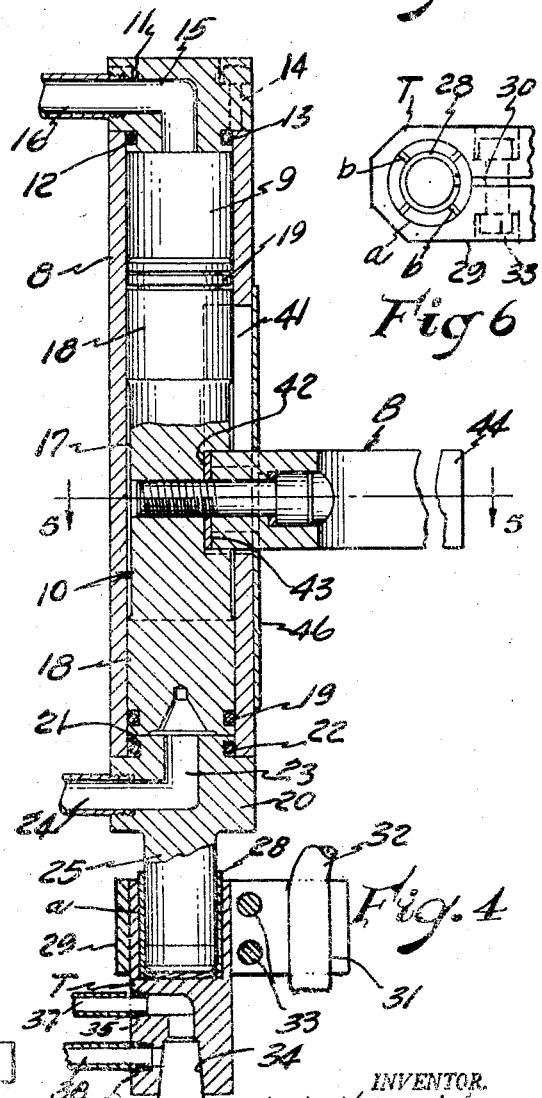
Fig. 6
Fig. 4
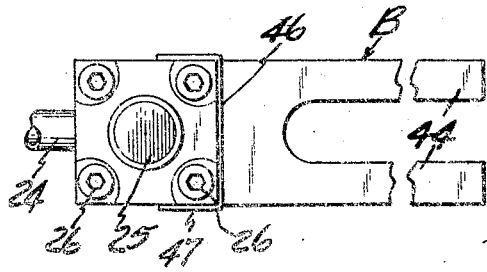
Fig. 3
INVENTOR.
Ralph H. Koehler
BY
Harmon & Harmon
ATTORNEYS

United States Patent Office 2,856,513
Patented Oct. 14, 1958

2,856,513

WELDING GUNS

Ralph H. Koehler, Saginaw, Mich., assignor to Resistance Welder Corp., Bay City, Mich., a corporation of Michigan Application October 28, 1955, Serial No. 543,304

8 Claims. (Cl. 219—89)

This invention relates to welding equipment and more particularly to welding guns for spot welding.

One of the prime objects of the invention is to design a welding gun of simple, practical and substantial design which does not rotate when mounted in position and in use on a welding machine.

Another object is to provide a welding gun which can be either single or double acting, and which has no exposed sliding or sealing surfaces to pick up weld flash, dust, or dirt or other foreign particles.

A further object of the invention is to design a welding gun in which the housing reciprocates with relation to the piston so that the bearing length is maintained constant regardless of the position of the piston or length of stroke, eliminating overhanging of the piston rod and possibility of bending same.

A further object still is to provide a welding gun of rugged construction and design in which the body of the gun moves with the tip holder, stabilizing the structure and making for long life with a minimum of wear and maintenance.

Still a further object is to provide a welding gun composed of a minimum number of parts, all of which can be readily manufactured, assembled and mounted in position on a welding machine.

With the above and other objects in view, the present invention consists of the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawings:

Fig. 1 is a sectional, side elevational view showing my improved welding gun.

Fig. 2 is a transverse sectional view taken on the line 2—2 of Fig. 1.

Fig. 3 is an inverted plan view.

Fig. 4 is a view similar to Fig. 1 showing a double acting gun with a tip holder, etc. in position thereon.

Fig. 5 is a transverse sectional view taken on the line 5—5 of Fig. 4.

Fig. 6 is a fragmentary top plan view of the tip holder bracket, etc.

Welding guns of the general nature herein referred to have a tendency to rotate when in operation on a welding machine, and this is generally unsatisfactory in that the welds will not be uniform, the electrode wear will be uneven and results ofttimes unsatisfactory; further, where offset tip or electrodes are used, the construction is even more unsatisfactory, and this unsatisfactory rotation feature I have eliminated in my improved design as shown in the accompanying drawing, and without additional cost or sacrifice of operation.

Referring now more particularly to Figs. 4, 5 and 6 of the drawing, wherein I have shown a double acting gun, the numeral 8 indicating a housing preferably, but not necessarily, square in cross section, said housing being suitably bored as at 9 to slidably accommodate a piston 10 as usual.

A head 11 forms a closure for the blind end of the housing 8, said head being shouldered as at 12 to snugly fit the inner diameter of the bore 9, and a hydraulic seal 13 is provided in the shouldered end 12 to form a leakproof joint thereat, cap screws 14 serving to hold the cap securely in position. A passage 15 is provided in the head 11 and opens to the bore 9 and a pipeline 16 leads to a suitable source of pressure supply (not shown).

The center section of the piston 10 is turned as at 17 to form spaced apart bearing sections 18—18 with hydraulic seals 19—19 at opposite ends thereof.

The shank end of the housing is formed similar to the blind end with a cap 20 forming a closure for same, said cap being shouldered as at 21 to fit into the end of the bore 9, and a hydraulic seal 22 is provided in said shouldered section to provide a leakproof joint thereat. An angularly disposed passage 23 leads through the cap as shown, and a fluid conductor 24 is connected thereto and to a suitable source of pressure supply.

A shank 25 is preferably, but not necessarily, formed integral with the cap 20 and is cylindrical as shown, and cap screws 26 serve to secure the shank to the housing.

A tip holder T is mounted on the shank 25, one end being bored as at a, and said holder is longitudinally split as at b. This bore accommodates a split insulating sleeve 28 and a forked clamping bracket 29 is fitted over the split end of the holder, this bracket being forked as at 30, said forks being bored as at 31 to accommodate the cable conductor 32, and screws 33 span the forks to secure the clamp in position.

A tapered opening 34 is provided in the free end of the tip holder T and an electrode E is mounted therein, openings 35 and 36 being provided in the side wall of the tip holder and hose connections 37 and 38 open to said electrode and to a source of coolant supply (not shown) so that the cooling medium flows through the electrode and cools same. This tip holder is, however, of conventional design, and forms no part of the present invention.

A slotted opening 41 is provided in sidewall of the housing 8 and the inner end of a bracket support B extends through said slot into a flat recess area 42 provided on said piston, with a washer 43 interposed between the end of the bracket and the piston to provide a proper working surface, this flat ended bracket, in intimate facial contact with the flat surface 42 of the piston, preventing any rotation of the gun when in operation.

The outer end of the bracket support B is forked as shown at 44 and a cap screw 45 is inserted between said forks, said cap screw extending through said bracket and being threaded into said piston, all as clearly shown in Figs. 4 and 5 of the drawing.

A U-shaped shield 46 spans the sidewall of the gun with the wings 47 slidably engaging the walls of the housing, said shield forming a closure for the slot in the housing, so that dust, weld flash, and dirt particles cannot enter.

When the piston 10 is in position shown in Fig. 4 of the drawing the gun is in its retracted position, and in operation the pressure medium enters through pipe 24, thence through passage 23, bearing against the piston 10 and forcing the housing tip holder assembly and electrode downwardly to provide the desired welding pressure, etc. Upon completion of the welding cycle, the pressure medium is admitted to the blind end of the bore 9 forcing the housing to retract on its return stroke, and I wish to direct particular attention to the fact that the gun housing reciprocates and not the piston, thus the bearing area remains the same at all times and there is no overhang, thus eliminating any tendency to bend, or the bearings to bind.

The construction shown in Figs. 1, 2 and 3 of the drawing is substantially the same as shown in Figs. 4 and 5, excepting that it is a single-acting gun, and the head 48 is bored as at 49, with an air vent 50 leading to atmosphere, there being no pressure medium connection. The piston 10 is bored as at 51 and a compression spring 52 is seated in said bores 49 and 51, otherwise the construction is the same.

In operation the pressure medium flows through pipeline 24 and bears against the piston, forcing the gun housing downwardly and compressing compressive spring 52. When pressure is released the spring 52 returns the housing to original position.

The bracket mount support is identical to that shown in the double acting gun and no further description is deemed necessary.

From the foregoing description it will be obvious that I have perfected a very simple, practical, and relatively inexpensive welding gun for welding material of all kinds.

What I claim is:

1. A welding gun comprising a reciprocable bored housing having a welding tip mounted on one end thereof, a stationary piston in said housing, ports in the opposite ends of the housing and a pressure medium connected thereto for reciprocating said housing relative to said piston, a slotted opening in said housing and means extending through said opening and conected to said piston for preventing rotation of said housing.

2. The combination defined in claim 1 in which said means comprises; a bracket releasably connected to said piston, and a shield mounted on said bracket in sliding engagement with said housing.

3. The combination set forth in claim 1 in which the wall of the piston is flatted for connection to said bracket and the shield is U-shaped to engage the walls of said housing.

4. A welding gun of the class described comprising a closed reciprocable bored housing, having a welding tip mounted on one end thereof, a stationary piston mounted in said bore, a pressure medium connected to the tip end of the housing to bear against the end of the piston and force the tip into engagement with the work, an elongated slot in said housing open to said piston, a stationary bracket extending through said slot and secured to said piston, and a shield fixed to said bracket forming a closure for said elongated slot.

5. A welding gun comprising a reciprocable bored housing having a welding tip secured on one end thereof; a piston mounted in said bore and rigidly connected to a welding machine; said housing having a slotted opening of predetermined width and length provided therein; a bracket remote from said tip extending through said slot in the housing into engagement with said piston for preventing rotation of said housing; means for non-rotatably securing said piston to said bracket; and means for reciprocating said housing.

6. A welding gun for mounting on a welding machine comprising; a relatively reciprocable housing and piston assembly, said housing having an elongate axially extending slot, and the piston having an opening in radial alignment with the slot; bracket means fixing said piston stationary with the machine; a welding electrode secured to one end of the reciprocating housing member, said bracket means extending into said slot and into the opening and being of less length than said slot so as to have substantial relative axial movement therewith; engaging mating surfaces on said housing and piston assembly and on said bracket preventing relative rotation of said tip, and means on said bracket forming a closure for the slot in the housing.

7. A welding gun for mounting on a welding machine comprising; a relatively reciprocable housing and piston assembly, said housing having a slot in a side wall thereof; bracket means fixed on said piston members stationary with the machine; a welding electrode mounted on one end of said housing; said bracket member preventing relative rotation of said piston and housing and thereby anchoring said tip in non-rotative disposition, said means on said bracket forming a closure for the slot in the housing.

8. A welding gun comprising; a reciprocable bored housing having a welding tip member secured on one end thereof; a piston mounted in said bore and rigidly connected to a welding machine; means remote from said tip comprising a laterally projecting bracket projecting through said housing into engagement with said piston for preventing rotation of said housing; means for reciprocating said housing, and means on said bracket and sildably engageable with said housing to form a dust-proof closure for said slot.

References Cited in the file of this patent

UNITED STATES PATENTS

| | | |
|---|---|---|
| 1,703,683 | Moesta | Feb. 26, 1929 |
| 2,256,028 | Jardine et al. | Sept. 16, 1941 |
| 2,506,277 | Panik et al. | May 2, 1950 |